United States Patent [19]

Loebner

[11] Patent Number: 4,949,079
[45] Date of Patent: Aug. 14, 1990

[54] BRIGHTPEN/PAD GRAPHIC DEVICE FOR COMPUTER INPUTS AND THE LIKE

[76] Inventor: Hugh Loebner, 220 W. 98th St., #2B, New York, N.Y. 10025

[21] Appl. No.: 46,722

[22] Filed: May 7, 1987

Related U.S. Application Data

[63] Continuation-in-part of Ser. No. 725,126, Apr. 19, 1985, abandoned.

[51] Int. Cl.⁵ .............................................. G09G 5/00
[52] U.S. Cl. ..................................... 340/706; 340/709; 340/707; 382/58
[58] Field of Search ............... 340/706, 707, 708, 709, 340/712; 178/18; 382/56, 68; 358/285, 488, 496

[56] References Cited

U.S. PATENT DOCUMENTS

| | | | |
|---|---|---|---|
| 3,337,860 | 8/1967 | O'Hara, Jr. ......................... | 340/707 |
| 3,539,995 | 11/1970 | Brandt ............................ | 340/365 P |
| 3,613,066 | 10/1971 | Cooreman .......................... | 178/18 |
| 3,618,029 | 11/1971 | Graven ............................. | 340/707 |
| 3,673,579 | 6/1972 | Graven ............................. | 340/365 S |
| 4,078,151 | 3/1978 | McNeary ........................... | 178/18 |
| 4,205,304 | 5/1980 | Moore .............................. | 340/707 |
| 4,292,621 | 9/1981 | Fuller ............................. | 382/46 |
| 4,464,652 | 8/1984 | Lapson et al. ..................... | 340/710 |
| 4,517,559 | 5/1985 | Deitch et al. ..................... | 340/712 |
| 4,550,250 | 10/1985 | Mueller et al. .................... | 340/710 |
| 4,553,842 | 11/1985 | Griffin ............................ | 340/712 |
| 4,688,933 | 8/1987 | Lapeyre ........................... | 178/18 |
| 4,704,698 | 11/1987 | Reiniger ........................... | 358/285 |
| 4,707,109 | 11/1987 | Kanno et al. ...................... | 340/707 |
| 4,743,974 | 5/1988 | Lockwood .......................... | 358/285 |
| 4,788,587 | 11/1988 | Bitoh .............................. | 358/285 |
| 4,816,921 | 3/1989 | Akiyama et al. .................... | 358/285 |

FOREIGN PATENT DOCUMENTS 0039232  3/1985  Japan ..................................... 340/712

OTHER PUBLICATIONS

"Input for Computer Graphics Display", by A. Spiridon, in Western Electric Technical Digest, No. 22, Apr. 1971, p. 39.

Primary Examiner—Jeffery A. Brier

[57] ABSTRACT

Scanning devices are used to enter graphic information into computer systems. They typically use photo-optic detectors. Digitizing devices are used to enter coordinate positions into computer systems. One technique uses styluses, either fingers or light emitters. This invention shows how the same photo-optical systems can perform both functions.

4 Claims, 4 Drawing Sheets

*Figure 3.B*

BRIGHTPEN/PAD GRAPHIC DEVICE FOR COMPUTER INPUTS AND THE LIKE

This application is filed as a continuation in part to application Ser. No. 06/725,126 now abandoned.

BACKGROUND OF THE INVENTION

The present invention relates to a device capable of inputting X, Y coordinates of a light emitting or absorbing stylus into a computer. Its design is such that the photo detectors used to determine the Cartesian coordinates of the stylus are used to digitize graphic information contained on sheet material such as paper.

Several techniques are known by which X and Y coordinates can be entered into a computer or other type system. Each has limitations which are avoided by the present invention.

The computer mouse system such as found in U.S. Pat. No. 4,464,652, and other patents, uses a hand-held device moved over a flat surface. X and Y movements of the mouse are converted into electronic signals transmitted to a computer. Generally, one or more buttons found on the mouse can be depressed to indicate desired actions. There are several characteristics of the mouse which may lessen its utility. First, the movement of the mouse occurs over a surface distinct from the screen of the computer. The user must, therefore, mentally translate the desired actions from the screen to the surface of the a desk. Second, the usual design of the mouse required that movements occur using gross arm movements rather than the precise movements of which the human hand is capable. This limits the accuracy of the X, Y coordinate indications. Third, some mouse designs require a special pad on which the mouse must move; all require necessary desk space in addition to the computer system for mouse movements. Calculating the total "footprint" (or required desk space) of the computer system must include, therefore, the necessary space for mouse movement. Fourth, mice designs generally require a connecting wire to the computer.

A second general technique used to enter X, Y coordinates into a computer system is the lightpen, for example U.S. Pat. No. 3,337,860. The lightpen in general is a hand-held wand having one or more photodetectors at one end. Placing the detector against the CRT screen of a computer display activates the photodetector when the raster spot passes under the detector. Timing circuits permit the determination of the coordinates of the lightpen. There are several limitations to the lightpen. First, for the lightpen to operate, it is necessary for the areas under the pen to be illuminated by the raster spot. Hence, it may be necessary to "flash" (light entirely) the screen to insure that the pen is not held to a dark, non-illuminated area. Second, because the lightpen works by timing when the section of screen it is held against is momentarily lit it follows that the nature of the phosphor used in the screen is an important parameter. Long persistence phosphors, which may be desirable to reduce flicker, can interfere with operation of the lightpen. Third, since there is a space between the inner surface of the CRT which is illuminated and the photodetector of the lightpen, parallax errors may occur. Fifth, light pens, too, generally require a connecting wire to the computer. Sixth, by their very design, lightpens work only be timing the illumination of small sections of CRT's or other displays whose screens are differentially lit at different times by a small illuminated spot. Light pens can not be used with flat screen displays which operate by other means.

A third method of entering X, Y coordinates, e.g. U.S. Pat. No. 4,205,304, is to use an opaque object, commonly a finger, to interrupt a rectangular grid of narrow light beams parallel to, and above, the CRT screen, focused on photodetectors at sides opposite from the light sources. Position is indicated by determining which beams in the X and Y direction are obstructed. This technique has the virtue of not requiring the user to manipulate a stylus or the device. One's finger is always at hand. One difficulty with previous designs is the necessity of directing the light from the light sources toward the photodetector. Several techniques have been used, for example complex circuitry to sequentially activate light sources, in order to ameliorate the problem of misalignment of light detector and light source. Another limitation to this technique is the requirement that there be a clear line of sight across the screen except for the obstructing finger or stylus. Thus, the user can not rest on the CRT or display screen any part of the hand such as the palm, heel or side in order to stabilize the finger for precise pointing.

Several patents have been issued for devices using light emitting styli to indicate Cartesian coordinates for computer input. The apparatus in U.S. Pat. No. 4,078,151 uses a plurality of photodetectors arrayed along the periphery of panel. As a light emitting stylus approaches any of the detectors, analog output from that detector increases. The position of the stylus is determined by the balance of analog outputs of photodetectors located on opposite sides of the pad. The present invention differs significantly from the apparatus in U.S. Pat. No. 4,078,151 in several respects. First, U.S. Pat. No. 4,078,151 requires a clear line of sight across the display surface, since it depends on a balance of analog outputs. Second, it is incapable of the detection of a light obstructing stylus such as a finger if desired. Third, it in incapable of resolving an image, and hence can not be used to digitize graphic material on a paper or the like.

U.S. Pat. Nos. 3,539,995, 3,618,029 and 3,673,579 use a pad consisting of a matrix of light detectors over which a light emitting stylus moves. It can easily be determined that to have a resolution of M by N units, it will be necessary to have M times N total detectors. For high resolution purposes, this can result in a very large number of detectors. Also, if the matrix of detectors is to be interspersed with a display screen, the mix of detectors and display elements will produce a undesirable granularity in both display and detection. Hereto, this technique also does not permit digitization of graphic material on paper or the like nor can it detect the position of opaque non-light emitting styli or fingers.

U.S. Pat. No. 4,550,250 also uses a light emitting stylus to indicate Cartesian coordinates for computer input. Inspection of U.S. Pat. No. 4,550,250 will clearly demonstrate significant differences between that invention and the one revealed here. U.S. Pat. No. 4,550,250 compares the analog output of a triangular or other shaped detector (whose analog output varies with the position of incident light) with that of a reference detector. The detectors of U.S. Pat. No. 4,550,250 can not digitize graphic information. Also, it would be impossible for the detectors of U.S. Pat. No. 4,550,250, to detect the position of an opaque light absorbing stylus or finger.

Many patents have been issued for the use of detectors to digitize graphic material on paper and the like, as well as associated logic for the recognition of character information contained thereon. For example, U.S. Pat. No. 4,292,621 reveals a device for character recognition which uses novel direction for the document movement. The difference between the invention revealed in this application and previous patents issued for the digitization of graphic information on paper and the like, as well as the body of knowledge generally know to artisans in this area, is in the use of photodetectors used otherwise to determine the position of a light emitting or absorbing stylus to also be used for the digitization of said graphic information.

SUMMARY OF THE PRESENT INVENTION

It is a principal object of the present invention to provide an apparatus to improve current techniques for entering X and Y coordinate information into a computer and other systems. The first major advantage of the invention is that it permits the use of either a light emitting stylus or an opaque object such as a finger to enter the coordinate data depending on the needs and wishes of the user. It is a second major advantage of the invention to utilize the photodetectors necessary for the digitization of the X and Y coordinate data to also digitize graphic information that may be on paper or the like.

The apparatus comprises (A) planar surface such as a CRT screen having positions thereon identifiable by an X and Y coordinate system, (B) a plurality of light detectors which are aligned along the X and Y coordinates, (C) associated light collimators serving to restrict the acceptance angle of each detector, (D) diffused light emitting sources opposite the light detectors, (E) a switching mechanism and associated logic used to enable or disable the aforementioned light sources, (F) a movable light emitting device such a penlight or stylus ("BRIGHTPEN") to be moved over the surface to different coordinate positions when the light emitting panels are "OFF" and the device is in "BRIGHTPEN MODE", and (G) a system of rollers, either free wheeling or driven by stepper motor or other means used to transport paper or the like past the line of sight of photodigitzers for the purpose of digitizing graphic information on the said paper.

BRIEF DESCRIPTION OF THE DRAWINGS

Other features and advantages of the graphic apparatus according to the invention, will become apparent from the following specifications, claims and appended drawings in which:

FIG. 3a is a partial diagrammatic side elevation of the graphic apparatus in FIG. 1 and 2 illustrating the detection of light emitted from the light pen;

FIG. 3b is a partial diagrammatic side elevation of the graphic apparatus in FIG. 1 and 2 illustrating the process of graphic digitization of material on paper and the like;

FIG. 3c is a partial diagrammatic side elevation of the graphic apparatus in FIG. 1 and 2 illustrating the detection of light emitted interrupted by a finger;

DESCRIPTION OF THE PREFERRED EMBODIMENTS OF THE INVENTION

The present invention as explained hereafter, uses one or more photodetectors to determine the position of a light emitting stylus, or alternately, a light absorbing stylus such as a finger. The position is converted into binary coded electronic signals suitable for transmission to a computer or other apparatus. The configuration of the photodetectors is such that the detectors used to determine the position of the stylus can also be used to digitize graphic information contained on a sheet of paper or like surface. Alternately, the invention can be considered a device to digitize graphic information on sheets of paper that is also capable of determining the coordinate position of light emitting or absorbing stylii.

Figure 1:
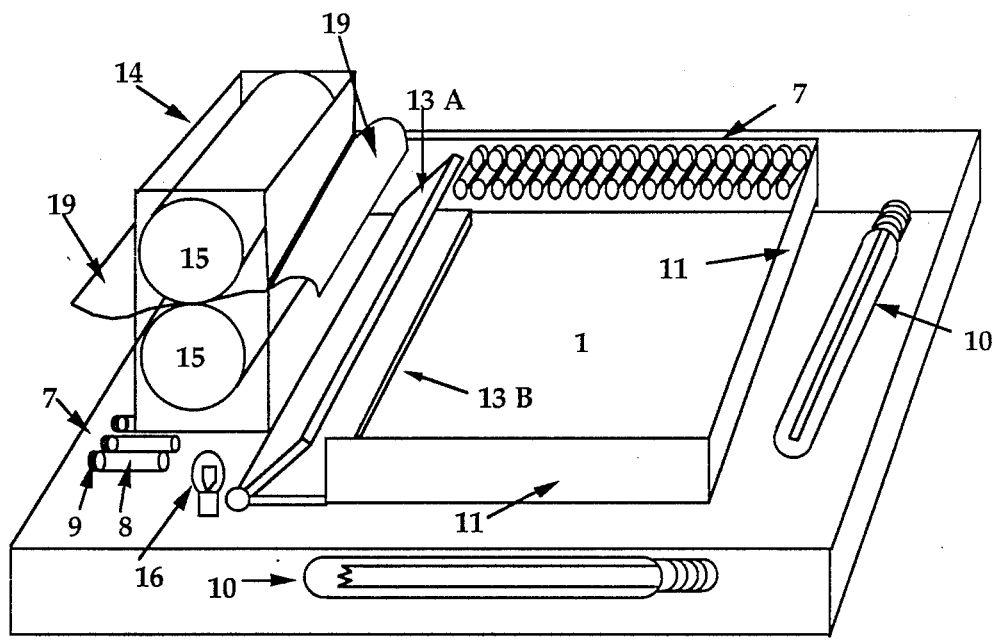
FIG. 1 is a perspective view of a graphic apparatus embodying the invention.

FIG. 1 shows a perspective view of the preferred embodiment of the invention. An essentially flat surface 1, such a CRT screen, LCD display, or plasma display is bordered on two sides by linear arrays 7 of light detectors 9 situated behind collimators 8 shown as here as tunnels. Light emitters 10 are situated on the opposite sides from the detector arrays 7. Interposed between the light emitters and the detectors are translucent screens 11 serving to diffuse the light from the emitters. Light emitters 10 with translucent screens 11 are depicted in FIG. 1. Alternately, solid state light emitting panels can be used.

Situated above one detector array 7 is the graphic digitizer 14 consisting of rollers 15 and light 16. In front of the detector array 7 is a single movable mirror depicted in two separate positions, up: 13a and down: 13b. The paper sheet 19 containing the information which is desired to be digitized is shown passing between the rollers 15.

Figure 2:
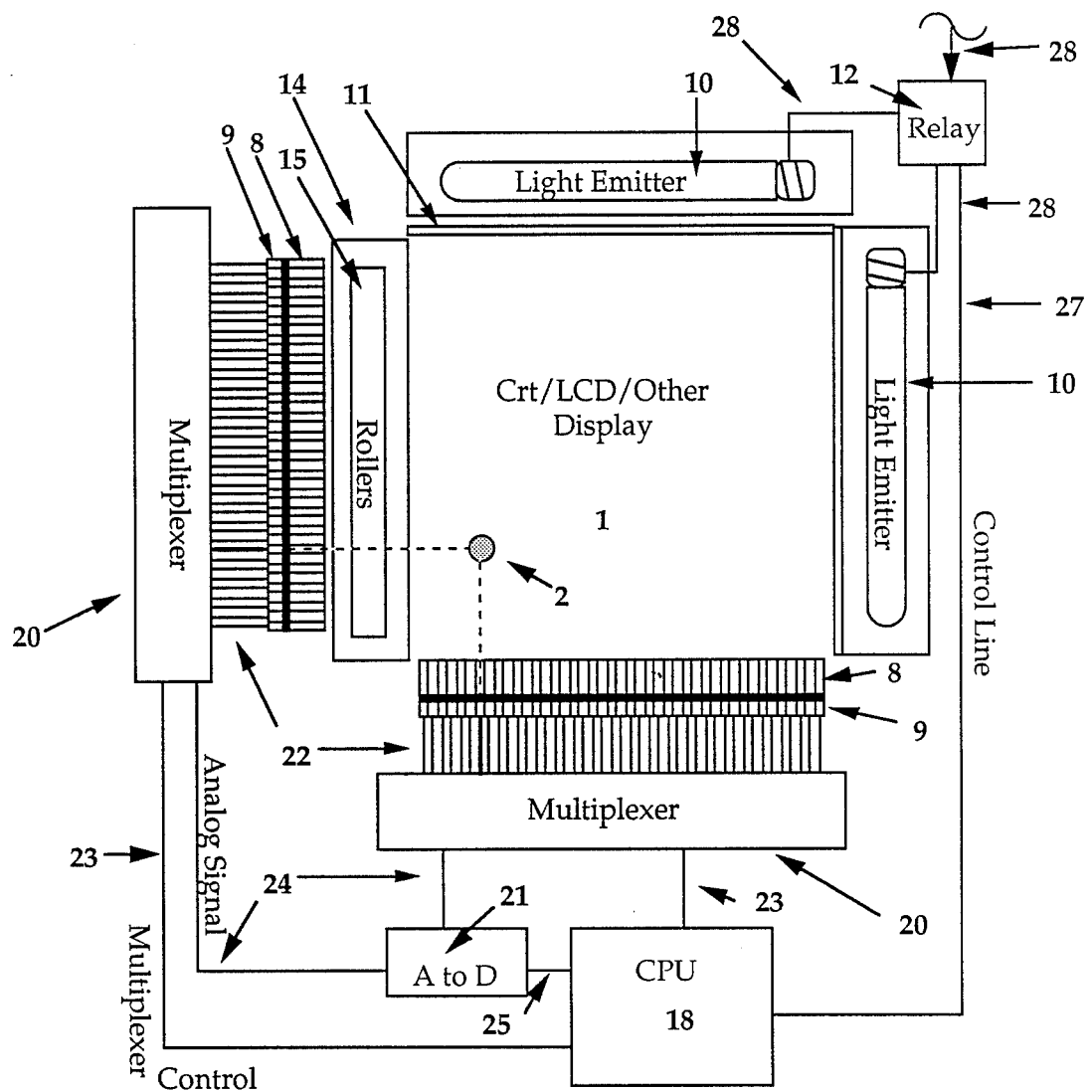
FIG. 2 is a diagrammatic plan view of the graphic apparatus in FIG. 1.

FIG. 2 shows a plan view of the preferred embodiment of the invention. A light emitting stylus 2 is at a coordinate position on the screens 1. Light rays from the stylus pass through collimators, illustrated as a narrow tubes 8, and strike detectors 9 in the array 7. The center to center distance between detectors 9 depends on desired resolution and available detector array technology. In order to usefully digitize graphic material, it is assumed that a minimum resolution of 10 bits per inch are desired, giving a center to center dimension of 0.1 inch. Arrays are commercially available from vendors which exceed these specification. EG&G Reticon RL2048H for instance has 2049 CCD detectors with a center to center distances of 0.006 inches.

Techniques well known to practitioners in the art are used by a computer 18 to sequentially address, using a multiplexer control lines 23 photodetectors in the array, using an analog multiplexer 20. Output from the multiplexers 20 are transmitted via signal lines 24 to an analog to digital converter 21 which converts the analog signal to binary information. The said binary information is transmitted via signal line 25 to processor 18. Although address and signal lines are represented in FIG. 2 by single lines, actual implementation may be by multiple lines carrying parallel rather than serial information. Although FIG. 2 shows the multiplexer 20 under control of processor 18, commercially available detector arrays exist in which the multiplexer is provided internal to the detector (e.g. E.G. & G. Reticon 1024G). This type of detector, which is a CCD array, requires an external clock signal. Sequential receipt of clock pulses produces a corresponding voltage output from each cell in the array. By counting clock pulses and correlating the digitized output from the detector, the relative or absolute illumination on each individual cell is determined.

FIG. 2 shows the digitization of cartesian information from a light emitting stylus "BRIGHTPEN". If the computer operator desires to use an opaque light absorber such as has finger to indicate coordinate position, then inputting such information into the processor presumably via a keyboard (not shown) causes said processor 18 to energize light emitters 10 with line power 28 via control line 27 to relay 12. The detection of the stylus position in either case is elementary. If a light emitter is used, than the position in the X, Y coordinates are the centers of the relative maxima, if a light absorber is used, then relative minima are used.

Figure 3:
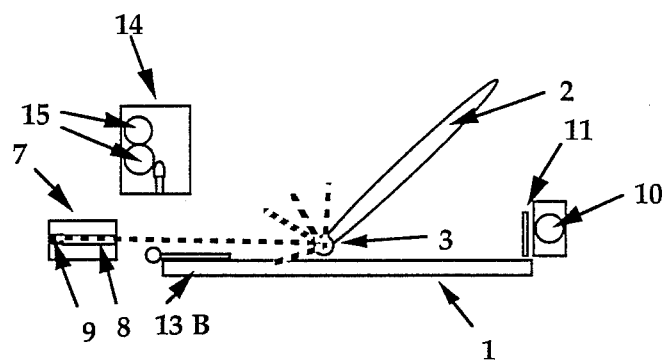
Figure 3:
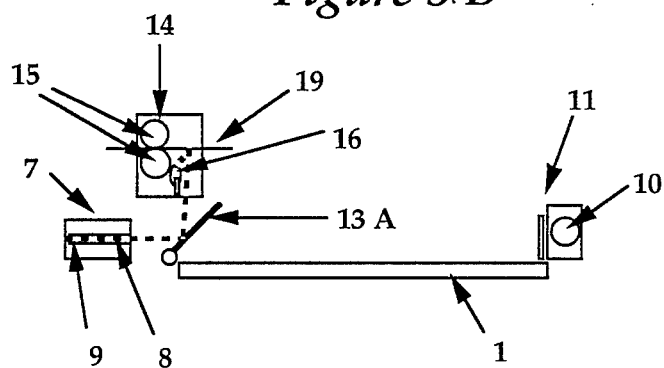
Figure 3:
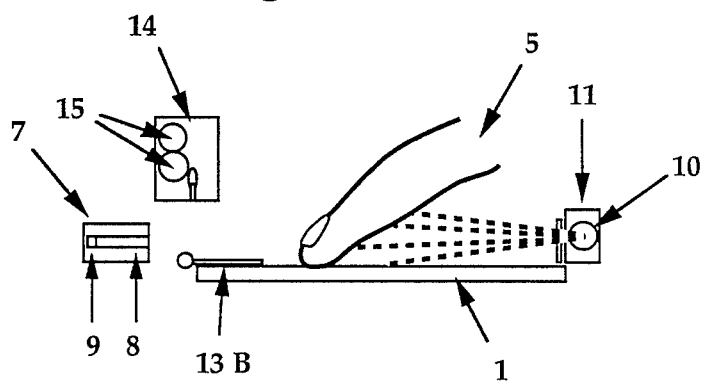

FIGS. 3a, 3b, and 3c show fragmentary side elevations of the detector, operating to (a). digitize coordinate information from a light emitting stylus, (b). graphic information from a sheet of paper, and (c). coordinate information from a finger, respectively.

When digitizing information from light pen 2 as shown in FIG. 3a, or finger 5, as shown in FIG. 3c, mirror 13b is in the down position, allowing photodetector array 7 clear sight across pad 1. FIG. 3a shows the light pen 2 emitting light rays which strike detector 9 in array 7 after passing through collimator 8. FIG. 3c shows finger 5 blocking a light ray from translucent screen 11 which as been illuminated by light emitter 10. An alternative to the movable mirror 13a, 13b is to use a semitransparent fixed mirror.

FIG. 3b shows a side elevation of the process by which graphic information on a sheet of paper may be digitized. Paper 19 is fed through rollers driven by stepper motors (not shown). Light from lamp 16 illuminates paper 19. Light rays from the paper are reflected from mirror 13a, now in up position, through collimator 8 to photodetector 9. Techniques well know to practitioners in the art are used to convert analog readings from the photodetector array into information suitable for input into the computer. Each step of the stepper motor corresponds to a separate row (Y coordinate) of pixel information to be digitized, while the output from each detector represents the column (X coordinate). Voltage output from the detector represents the grey scale to be assigned to the pixel. An alternate to using stepper motors to control the rollers can be to have free wheeling rollers which can be rotated by a thumb, and containing a position or timing track viewable by the photodetector. The row or Y dimension of the graphic information would then be determined by the position of the timing track.

Figure 4:
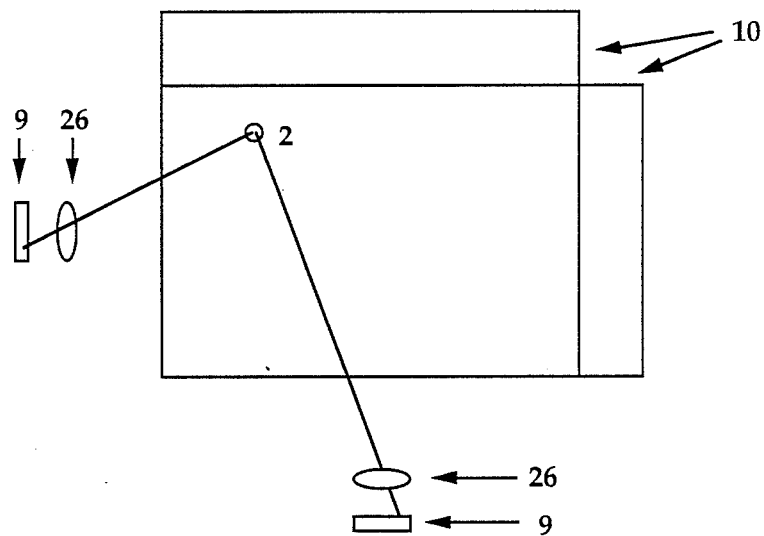
FIG. 4 is a partial plan view of the graphic apparatus using alternative imaging means.

FIG. 4 shows a partial plan view of an alternative embodiment of the invention using lenses 26 to image the light emitting stylus 2. In this configuration the detector apparatus 9 is considerably smaller than the dimensions of the pad. Elementary trigonometric triangulation permits the determination of the X, Y coordinates.

Figure 5:
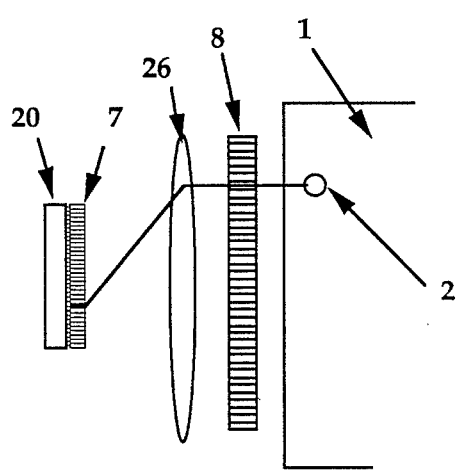
FIG. 5 is a partial plan view of the graphic apparatus using an alternative imaging means.

FIG. 5 shows a partial plan view of an alternative embodiment using both collimator 8 and lens 26 to produce the image of the light emitting stylus 2 on detector array 9. Although a simple convex lens is depicted, alternatives such as a fresnel lens, or a planoconvex lens might be employed.

Figure 6:
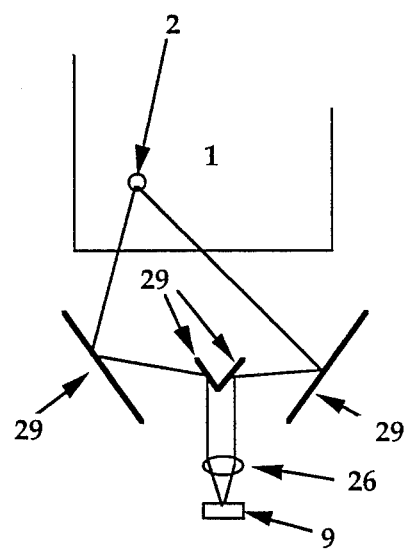
FIG. 6 is a partial plan view of the graphic apparatus demonstrating how the invention will work with a single detector array.

FIG. 6 shows a partial plan view of an alternative embodiment of the coordinate detection component of the digitizer demonstrating how mirrors 29 may be disposed to permit the use of a single detector array 9 to determine coordinate position.

FIG. 1 and subsequent figures show linear arrays of individual photodetectors, however, the invention will work equally well with any phototransducer capable of resolving an image, e.g. vidicon tubes, CCK arrays, etc. If a vidicon detector is used then multiplexing will not be necessary, however, timing of the output will be necessary to provide information.

Those skilled in the art will understand that additional information can be transmitted to the computer by the user of the light emitting stylus if apparatus is included to alter the intensity of the emitted light. Various techniques can be used. These include, but are not limited to, preferentially changing the number of lamps illuminated by means of on-off switches, interposing a shielding filter to decrease of increase emitted light as desired, changing voltages to the lamp by switching from one battery to another of different voltage, etc.

I claim:

1. An apparatus for digitizing graphic information on sheets of paper and the like comprising means of transporting said sheets of paper, photodetectors and collimators in the form of a detector array capable of imaging successive lines of graphic information on said sheet of paper and which photodetectors are also used to digitize the coordinate position of a light emitting stylus or light absorbing stylus by means for converting analog signals from said photodetectors to digital signals suitable for input into a computer or the like.

2. A graphic apparatus according to claim 1 in which the collimators are a plurality of next adjacent tubes and the detector array is a linear array of photodetectors aligned with, and behind the collimators.

3. A graphic apparatus according to claim 1 in which the detector array includes a lens.

4. A graphic apparatus according to claim 1 which uses a single detector array for imaging coordinate position of stylus comprising a plurality of mirrors.

* * * * *